(12) United States Patent
Noda

(10) Patent No.: US 8,344,856 B2
(45) Date of Patent: Jan. 1, 2013

(54) POSITION DETECTING SYSTEM AND CABLE UNIT

(75) Inventor: Keisuke Noda, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 278 days.

(21) Appl. No.: 12/793,934

(22) Filed: Jun. 4, 2010

(65) Prior Publication Data

US 2010/0328039 A1 Dec. 30, 2010

(30) Foreign Application Priority Data

Jun. 26, 2009 (JP) ................................. 2009-152298

(51) Int. Cl.
*H04Q 5/22* (2006.01)
*G08B 21/00* (2006.01)
*G08B 5/22* (2006.01)
*B61L 23/00* (2006.01)
*B61L 17/00* (2006.01)
*G06F 7/00* (2006.01)

(52) U.S. Cl. ................. 340/10.1; 340/686.1; 340/686.6; 340/8.1; 246/1 C; 246/1 R; 700/213; 700/219; 700/225

(58) Field of Classification Search ................. 340/10.1, 340/686.1, 572.1, 572.7, 933; 246/1 R, 1 C; 318/580, 587; 700/213–264; 174/110 R; 455/81, 82

See application file for complete search history.

(56) References Cited

U.S. PATENT DOCUMENTS

| 4,780,695 A * | 10/1988 | Watari et al. .................. 333/237 |
| 5,332,180 A * | 7/1994 | Peterson et al. .................. 246/3 |
| 6,285,858 B1 * | 9/2001 | Yoshida ........................ 455/41.2 |

FOREIGN PATENT DOCUMENTS

| JP | 07022986 | 1/1995 |
| JP | 2005-280963 | 10/2005 |

OTHER PUBLICATIONS

Japanese Office Action for Application No. 2009-152298 mailed on Apr. 19, 2011.

* cited by examiner

*Primary Examiner* — Brian Zimmerman
*Assistant Examiner* — Laura Nguyen
(74) *Attorney, Agent, or Firm* — Turocy & Watson, LLP

(57) ABSTRACT

A position detecting system according to an embodiment of the present invention includes a moving machine capable of moving along a predetermined path, plural storage media configured to store position information and arranged in parallel along the path, and a reading unit provided on the moving machine side and configured to read the position information of the storage media arranged in a reading range corresponding to the reading unit.

9 Claims, 6 Drawing Sheets

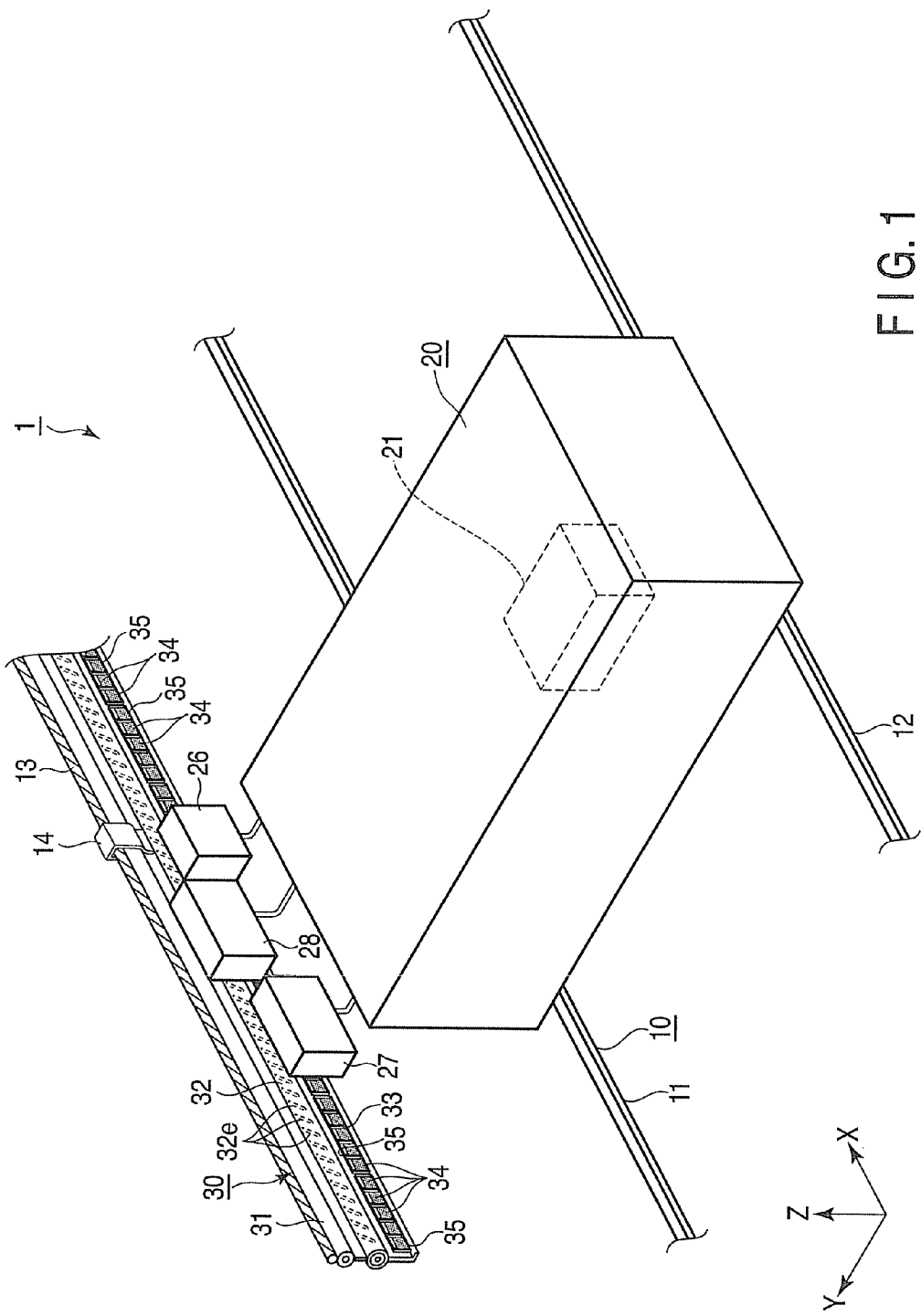
F I G. 1

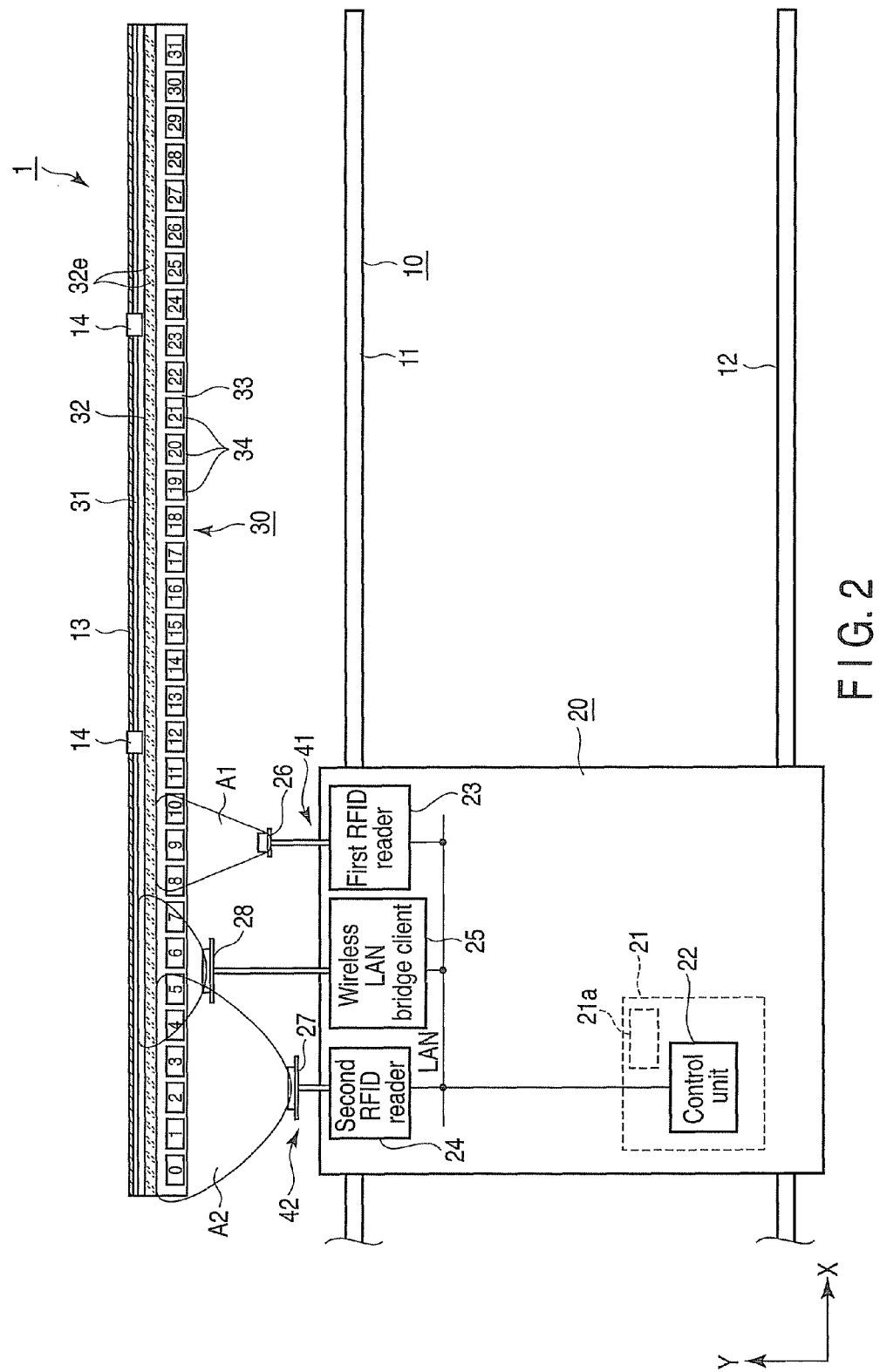
F I G. 2

|  | High-speed flag | Position information | |
|---|---|---|---|
|  |  | Higher order data | Lower order data |
| Tag0 | 1 | 000 | 0 |
| Tag1 | 0 | 000 | 1 |
| Tag2 | 0 | 000 | 2 |
| Tag3 | 0 | 000 | 3 |
| Tag4 | 0 | 000 | 4 |
| Tag5 | 0 | 000 | 5 |
| Tag6 | 0 | 000 | 6 |
| Tag7 | 0 | 000 | 7 |
| Tag8 | 0 | 000 | 8 |
| Tag9 | 0 | 000 | 9 |
| Tag10 | 1 | 001 | 0 |
| Tag11 | 0 | 001 | 1 |
| Tag12 | 0 | 001 | 2 |
| Tag13 | 0 | 001 | 3 |
| Tag14 | 0 | 001 | 4 |
| Tag15 | 0 | 001 | 5 |
| Tag16 | 0 | 001 | 6 |
| Tag17 | 0 | 001 | 7 |
| Tag18 | 0 | 001 | 8 |
| Tag19 | 0 | 001 | 9 |
| Tag20 | 1 | 002 | 0 |
| ⋮ | ⋮ | ⋮ | ⋮ |
| Tag1699 | 0 | 169 | 9 |
| Tag1700 | 1 | 170 | 0 |
| Tag1701 | 0 | 170 | 1 |
| ⋮ | ⋮ | ⋮ | ⋮ |
| Tag1919 | 0 | 191 | 9 |
| Tag1920 | 1 | 192 | 0 |
| Tag1921 | 0 | 192 | 1 |
| ⋮ | ⋮ | ⋮ | ⋮ |
| Tag1998 | 0 | 199 | 8 |
| Tag1999 | 0 | 199 | 9 |
| Tag2000 | 1 | 200 | 0 |
| Tag2001 | 0 | 200 | 1 |

⇐ Present position Pnow

⇐ Start deceleration Pdown

⇐ Start low speed

⇐ Stop position Pstop

FIG. 6

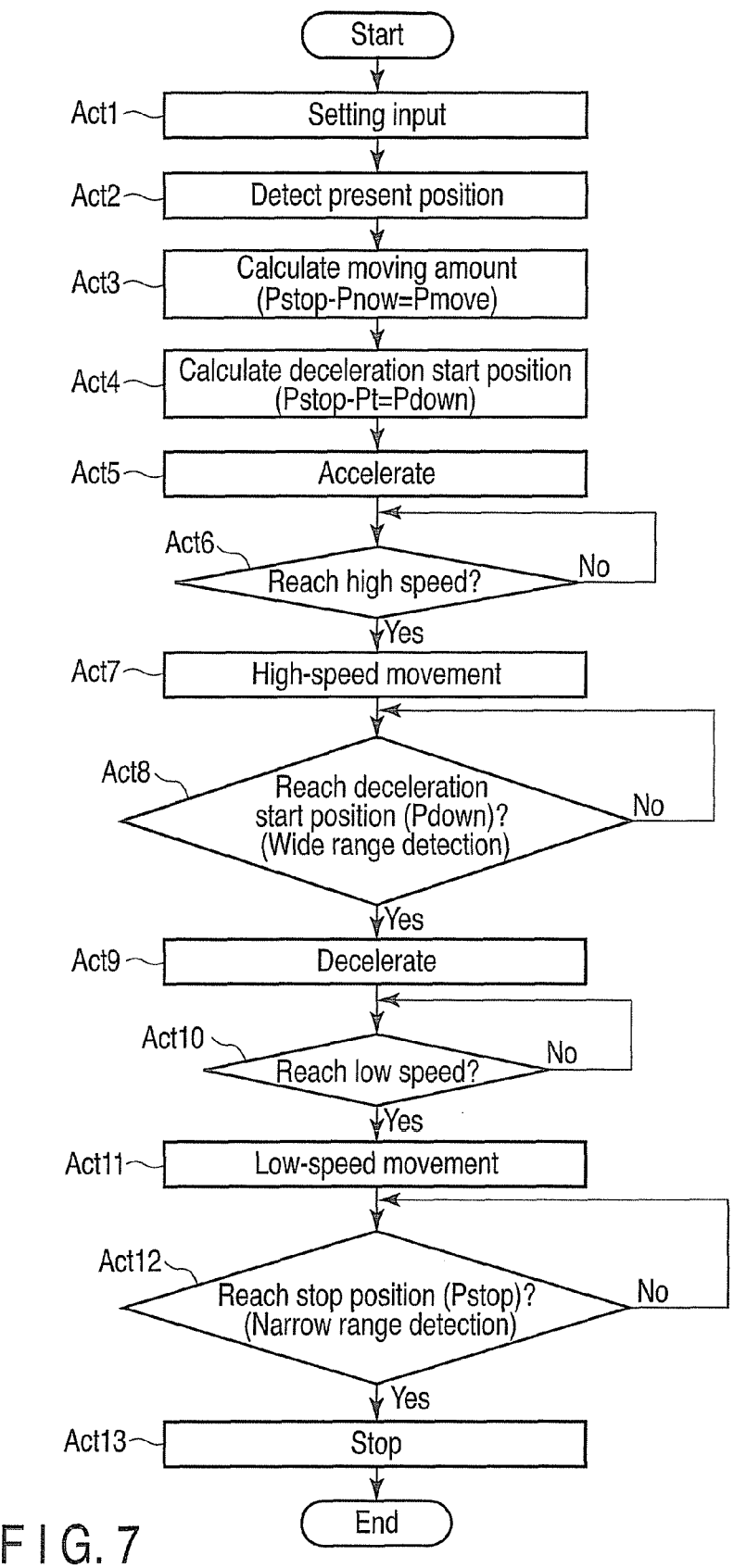
F I G. 7

POSITION DETECTING SYSTEM AND CABLE UNIT

CROSS-REFERENCE TO RELATED APPLICATION

This application is based upon and claims the benefit of priority from the prior Japanese Patent Application No. 2009-152298, filed Jun. 26, 2009, the entire contents of which are incorporated herein by reference.

TECHNICAL FIELD

An embodiment of the present invention relates to a position detecting system and a cable unit and relates to, for example, a position detecting system and a cable unit for detecting the position of a moving machine on a predetermined moving path.

BACKGROUND

In a factory, a warehouse, or the like, a moving apparatus configured to move a moving machine such as a crane on a predetermined moving path is adopted. In the moving apparatus of this type, position control for detecting the position of the moving machine and controlling an operation state of the moving machine on the basis of a detection result is performed. As a method of the position control, the position of the moving machine is detected by performing inductive radio communication between the moving machine on the moving path and a base station using an induction ratio technique.

A system configured to detect a position using the inductive radio technique needs to perform communication using plural antennas on the base station side and an antenna on the moving machine side in order to perform the inductive radio communication. Therefore, the system is large and complicated and cost of the system increase.

SUMMARY

An embodiment of the present invention has been devised in view of the circumstances and it is an object of the embodiment to provide a position detecting system and a cable unit configured to enable position control with a simple system and enable a reduction in facility expenses.

DESCRIPTION OF THE DRAWINGS

FIG. 1 is a schematic perspective view of the configuration of a moving apparatus according to a first embodiment of the present invention;

FIG. 2 is a schematic plan view of the configuration of the moving apparatus according to the embodiment;

FIG. 6 is a diagram for explaining position information of IC tags of the moving apparatus according to the embodiment; and FIG. 7 is a flowchart for explaining a position detecting method according to the embodiment.

DETAILED DESCRIPTION

Figure 3:
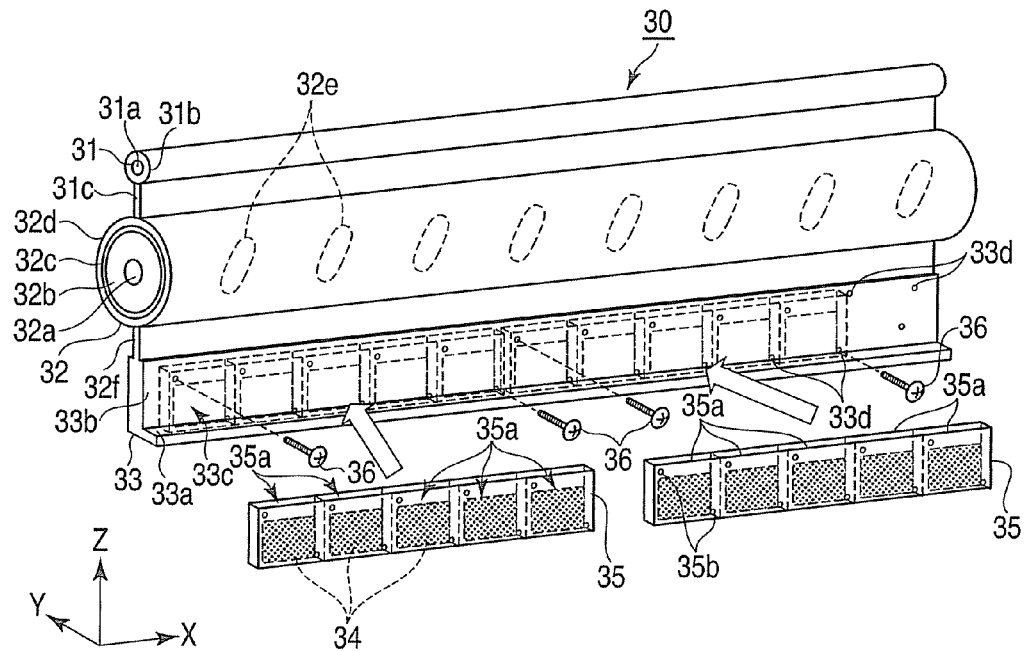
FIG. 3 is a perspective view of the configuration of a cable unit according to the embodiment.

A moving apparatus 1 according to an embodiment of the present invention is explained below with reference to the accompanying drawings. FIG. 1 is a schematic perspective view of the moving apparatus 1 according to a first embodiment of the present invention. FIG. 2 is a plan view of the moving apparatus 1.

The moving apparatus 1 is a crane apparatus provided in a factory such as an ironworks. The moving apparatus 1 includes a pair of rails 11 and 12 extending in an X direction in the figure to form a moving path 10, a supporting line 13 for cable laying set on a side of the pair of rails 11 and 12 along the moving path 10, a moving machine 20 such as a crane car provided to be movable on the rails 11 and 12, and a cable unit 30 (a cable antenna) fixed to the supporting line 13 and provided on the side of the rails 11 and 12 along the moving path 10.

Figure 4:
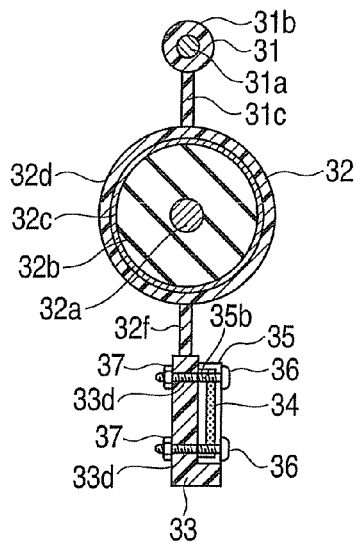
FIG. 4 is a sectional view of the configuration of the cable unit according to the embodiment.

As shown in FIGS. 3 and 4, in the cable unit 30, a fixed line 31 fixed to the supporting line 13 via fixing jigs 14, a leaky coaxial cable (LCX cable) 32 functioning as an antenna for radio communication, and a tag housing 33 (a housing) having IC tags 34 as plural storage media are integrated. A first outer skin member 31b of the fixed line 31, a second outer skin member 32d of the LCX cable 32, and the tag housing 33 are integrally formed by molding of synthetic resin.

The fixed line 31 has a fixing wire 31a in the center and the first outer skin member 31b that covers the fixing wire 31a. The LCX cable 32 is integrally supported by a belt-like first extending section 31c formed to extend to the outer side from the first outer skin member 31b forming the outer circumferential surface of the fixed line 31.

The LCX cable 32 includes an inner conductor 32a that is circular in section provided in the center, a cylindrical insulating section 32b that covers the outer side of the inner conductor 32a, an outer conductor 32c that covers the outer side of the insulating section 32b and has plural slots 32e, and the second outer skin member 32d that covers the outer side of the outer conductor 32c. The LCX cable 32 has a diameter of about 3 cm. The plural slots 32e of the outer conductor 32c act on one another and function as a transmission and reception antenna. In other words, the LCX cable 32 is a coaxial cable configured to transmit a high-frequency signal and also functions as an antenna for radio communication. The tag housing 33 is integrally formed in a belt-like second extending section 32f formed to extend to the outer side from the second outer skin member 32d forming the outer circumferential surface of the LCX cable 32.

The tag housing 33 is formed in an L shape in section having a lower wall section 33a configured to support the lower side of tag cases 35 and a rear wall section 33b configured to support the rear side of the tag cases 35. A housing section 33c configured to house the tag cases 35 is formed in the tag housing 33. The tag cases 35 are arranged in the housing section 33c.

All of the first outer skin member 31b forming the outer circumferential surface of the fixed line 31, the second outer skin member 32d forming the outer circumferential surface of the LCX cable 32, and the tag housing 33 are formed of soft synthetic resin and integrally formed in the same resin molding step in a cable manufacturing process.

The tag cases 35 are formed in an elongated box shape and have, on the inner side, plural housing spaces 35a sectioned at equal intervals. The IC tags 34 are respectively housed in the plural housing spaces 35a, whereby the plural IC tags 34 are held in parallel at equal intervals. The inside of one tag case 35 is sectioned into five housing spaces 35a. One IC tag 34 is held in each of the five housing spaces 35a. Plural attaching holes 35b and 33d are respectively formed in the tag cases 35 and the tag housing 33. The tag cases 35 are detachably screwed and fixed to the tag housing 33 by bolts 36 and nuts 37 via the attaching holes 35b and 33d.

The IC tags 34 are arranged in parallel at a pitch equal to or smaller than, for example, 10 cm. Each of the IC tags 34 stores order data as IC data that is position information. Specifically, since all the plural IC tags 34 are arranged at equal intervals, the order data of the IC tags 34 is proportional to distances from a reference value of the IC tags 34 and corresponds to the positions of the IC tags 34. Therefore, the order data is position information indicating the positions of the IC tags 34.

The fixed line 31 is fixed, by using the fixing jigs 14, to the supporting line 13 set in advance along the moving path 10, whereby the entire cable unit 30 is set along the moving path 10.

The moving machine 20 is, for example, a crane car. The moving machine 20 engages with the rails 11 and 12 and moves on the rails 11 and 12 along the moving path 10. The moving machine 20 includes a cockpit 21 having an operation input unit 21a operated by an operator, a control unit 22 configured to control various kinds of operation of the moving machine 20, a first RFID reader 23 configured to read information of the IC tags 34, a second RFID reader 24 configured to read information of the IC tags 34, and a wireless LAN bridge client 25 configured to perform radio communication with the LCX cable 32. On a side of the moving machine 20 opposed to the cable unit 30, a first antenna 26 (a first reading unit) for tags arranged in a first reading range A1, a second antenna 27 (a second reading unit) for tags arranged in a second reading range A2, and a third antenna 28 for the wireless LAN are provided. For example, along the direction of the moving path 10, the first antenna 26 is arranged on the distal end side and the second antenna 27 is arranged on the proximal end side. The third antenna 28 is arranged in a position between the first antenna 26 and the second antenna 27.

The second reading range A2 is wider than the first reading range A1. For example, about three to four IC tags 34 are included in an area of the first reading range A1. About twenty IC tags 34 are included in an area of the second reading range A2. Since the first antenna 26 and the second antenna 27 are provided in the moving machine 20, the first reading range A1 and the second reading range A2 move according to the movement of the moving machine 20. The first antenna 26 and the second antenna 27 are arranged a distance apart or arranged via a not-shown radio shielding member to prevent radio waves from interfering with each other.

The first antenna 26, the second antenna 27, and the third antenna 28 are respectively connected to the first RFID reader 23, the second RFID reader 24, and the wireless LAN bridge client 25.

The first RFID reader 23 and the first antenna 26 configure a first reading unit 41. The second RFID reader 24 and the second antenna 27 configure a second reading unit 42. The IC tags 34 as reading targets of the first reading unit 41 and the second reading unit 42 are common to the first reading unit 41 and the second reading unit 42. The first reading unit 41 and the second reading unit 42 provided on the moving machine 20 side and the plural IC tags 34 provided on the LCX cable 32 side configure a position detecting system.

The control unit 22 switches the two kinds of reading units 41 and 42 to thereby change a reading range such that the first reading unit 41 reads information of the IC tags 34 in the narrow first reading range A1 in a low-speed state and the second reading unit 42 reads information of the IC tags 34 in the wide second reading range A2 in a high-speed state.

Position information of the IC tags 34 according to this embodiment is explained below with reference to FIG. 6. The IC data as the position information recorded in the IC tags 34 is, for example, array information indicating the order of array of the IC tags 34. The IC data includes higher order data of higher three digits of a numerical value of the array information of the respective IC tags 34 and lower order data of lower one digit of the numerical value of the array information.

Among the IC tags 34, high-speed flags are set in only the IC tags 34, the lower order data of which is 0, arranged at equal intervals. In reading processing of the second reading unit 42, setting of filtering is performed such that the reading processing targets only the IC tags 34 for which the high-speed tags are set. Specifically, among all the IC tags 34 in the second reading range A2 of the second reading unit 42, the IC tags 34, the lower order data of which is not 0, are excluded from reading targets and the IC tags 34, the lower order data of which is 0, are set as reading targets. The first reading unit 41 sets, as processing targets, the three to four IC tags 34 arranged in the first reading range. The second reading unit 42 sets, as processing targets, two or three IC tags 34 set with the high-speed flags among the twenty IC tags 34 arranged in the second reading range A2.

A method of position control for the moving machine 20 according to this embodiment is explained below with reference to FIG. 7. As an example, position information of the present position Pnow is set as 0005, position information of a deceleration start position Pdown is set as 1700, and position information of a stop position Pstop is set as 2000.

In some cases, depending on a relation between a reference position indicating the position of the moving machine 20 and the positions of the first antenna 26 and the second antenna 27, a center position of a reading range and the reference position of the moving machine 20 are actually different. However, it is assumed that the center position of the reading range and the reference position of the moving machine 20 are adjusted when reference positions are set. Specifically, if position information of a detection result of the first reading unit 41 and the deceleration start position Pdown coincide with each other, it is assumed that the reference position of the moving machine 20 reaches the deceleration start position Pdown. If position information of a detection result of the second reading unit 42 and the stop position Pstop coincide with each other, it is assumed that the reference position of the moving machine 20 reaches the stop position Pstop.

First, in Act 1, the control unit 22 determines presence or absence of setting input of the stop position Pstop as a target position of the moving machine 20. The setting input is performed in a not-shown higher order system or the operation input unit 21a. If the control unit 22 determines that the setting input of the stop position Pstop is not performed (No in Act 1), the control unit 22 stays on standby until the setting input is performed. If the control unit 22 determines that the setting input of the stop position Pstop is performed (Yes in Act 1), the control unit 22 proceeds to Act 2. For example, the stop position Pstop is set to 2000.

In Act 2, the control unit 22 detects the present position Pnow as an initial position of the moving machine 20. In this detection processing for the present position Pnow, in a state in which the moving machine 20 is stopped, the control unit 22 performs, using the first reading unit 41, transmission and reception with three to four IC tags 34 arranged in the reading range A1 and detects the position of the moving machine 20 on the basis of read position information of the IC tags 34. For example, when IC data as the read position information of the three IC tags 34 is 0004, 0005, and 0006, the present position Pnow is 0005.

Subsequently, in Act 3, the control unit 22 calculates a moving amount Pmove of the moving machine 20 on the basis of the acquired present position Pnow of the moving machine 20 and the stop position Pstop subjected to the setting input. For example, the control unit 22 calculates the moving amount Pmove by subtracting the present position Pnow from the stop position Pstop subjected to the setting input. The moving amount Pmove is calculated as 2000−0005=1995. For example, when a value of the moving amount Pmove is a positive value, the moving machine 20 moves in a direction in which a numerical value of IC data on the distal end side in the X direction in the figure increases. When a value of the moving amount Pmove is a negative value, the moving machine 20 moves in a direction in which a numerical value of IC data on the proximal end side in the X direction decreases.

In Act 4, the control unit 22 calculates the deceleration start position Pdown. For example, the control unit 22 calculates, as the deceleration start position Pdown, a position on the front side obtained by subtracting a fixed amount Pt from the stop position Pstop. When the fixed amount Pt is 300, the deceleration start position Pdown is calculated as 2000−300=1700.

Figure 5:
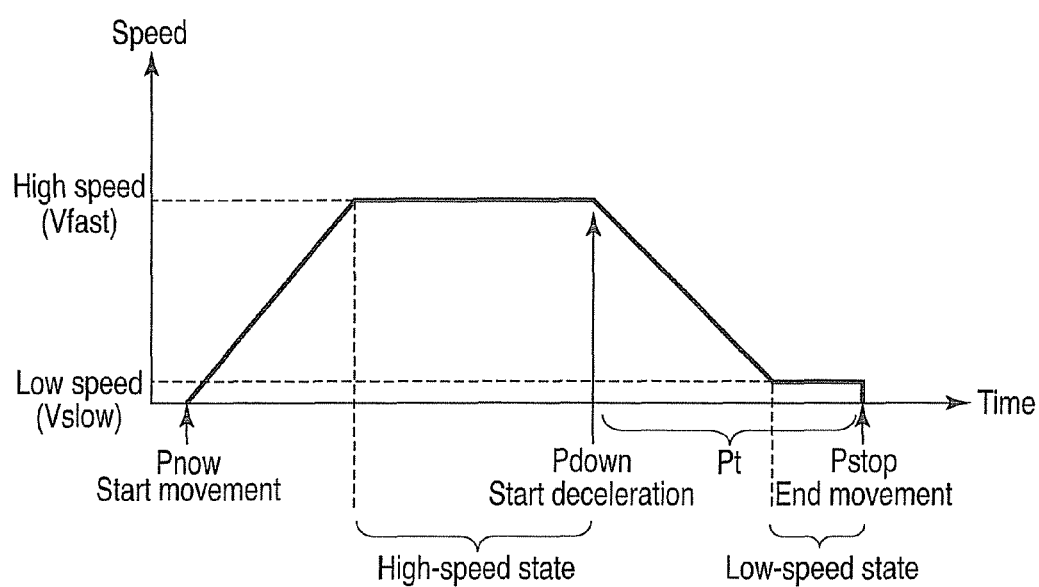
FIG. 5 is a graph of a relation between the position and speed of a moving machine and time according to the embodiment.

In Act 5, the control unit 22 moves the moving machine 20 while accelerating the moving machine 20. A relation between moving speed and time of the moving machine 20 to the stop position Pstop is shown in FIG. 5.

In Act 6, the control unit 22 detects the speed of the moving machine 20 and determines whether the speed of the moving machine 20 reaches predetermined high-speed reference speed Vfast. The control unit 22 continues the acceleration of the moving machine 20 until the speed of the moving machine 20 reaches the high-speed reference speed Vfast (No in Act 6). If the speed of the moving machine 20 reaches the high-speed reference speed Vfast (Yes in Act 6), the control unit 22 continues high-speed movement while maintaining the high-speed reference speed Vfast (Act 7). A state in which the moving machine 20 is moving at the high-speed reference speed Vfast is referred to as high-speed state.

In Act 8, the control unit 22 detects, in the second reading unit 42, the position of the moving machine 20 in the reading range A2 and determines whether the position of the moving machine 20 reaches the deceleration start position Pdown. In this case, it is possible to prevent a processed information amount from increasing even if the wide reading range A2 is set as a target since only the IC tags 34 attached with the high-speed flags are read. The control unit 22 continues the high-speed movement until the position of the moving machine 20 reaches the deceleration start position Pdown (No in Act 8). If the position of the moving machine 20 reaches the deceleration start position Pdown (Yes in Act 8), the control unit 22 continues the movement while decelerating the moving machine 20 (Act 9). For example, when IC data of the read IC tags 34 attached with the high-speed flags is 1690, 1700, and 1710, the control unit 22 determines that the position of the moving machine 20 reaches the deceleration start position Pdown 1700.

In Act 10, the control unit 22 detects the speed of the moving machine 20 and determines whether the speed of the moving machine 20 reaches predetermined low-speed reference speed Vslow. The control unit 22 continues low-speed movement of the moving machine 20 until the speed of the moving machine 20 reaches the low-speed reference speed Vslow (No in Act 10). If the speed of the moving machine 20 reaches the low-speed reference speed Vslow (Yes in Act 10), the control unit 22 continues the low-speed movement while maintaining the low-speed reference speed Vslow (Act 11). A moving state at the low-speed reference speed Vslow is referred to as low-speed state.

In Act 12, the control unit 22 detects, in the first reading unit 41, the position of the moving machine 20 in the narrow reading range A1 and determines whether the position of the moving machine 20 reaches the stop position Pstop. The control unit 22 continues the low-speed movement until the position of the moving machine 20 reaches the stop position Pstop (No in Act 12). If the position of the moving machine 20 reaches the stop position Pstop (Yes in Act 12), the control unit 22 stops the moving machine 20 (Act 13). For example, when IC data of the IC tags 34 in the reading range A1 is 1999, 2000, and 2001, the control unit 22 determines that the position of the moving machine 20 reaches the stop position Pstop.

With the position detecting system and the cable unit 30 according to this embodiment, effects explained below are obtained. In the moving apparatus 1, it is possible to perform position detection with a simple system of reading IC data of the plural IC tags 34 arranged in parallel along the moving path 10. Therefore, it is possible to hold down facility expenses.

In general, position detection accuracy of about 10 cm is necessary in the moving machine 20 having large size. However, by arraying the plural IC tags 34 at intervals that satisfy the accuracy, it is possible to secure necessary accuracy and inexpensively perform position detection.

In general, radio communication is performed between a moving machine and a control room. However, in a steel construction building such as an ironworks, the radio communication is unstable in a wireless LAN through an access point because of the influence of reflection or the like. Therefore, an LCX cable having a function of a transmission path and a function of an antenna is used. In the moving apparatus 1, since the IC tags 34 are integrally formed with the LCX cable 32, setting work can be simplified. Since the first outer skin member 31b forming the outer circumferential surface of the fixed line 31, the second outer skin member 32d forming the outer circumferential surface of the LCX cable 32, and the tag housing 33 are integrally formed in the resin molding step, a holding structure for the IC tags 34 can be easily formed. Further, since the respective IC tags 34 are formed detachably attachable, even if failure or the like occurs in a part of the IC tags 34, it is possible to replace the IC tags 34.

In general, when a large moving machine is moved to a desired stop position, at high moving speed, the moving machine cannot be quickly stopped and, at low moving speed, the moving machine moves for a long time. Therefore, the moving machine is moved to a position near the stop position at high speed and the position of the moving machine is adjusted at low speed after the moving machine is close to the stop position. In such a case, in the high-speed state, although it is difficult to secure processing time, it is sufficient if a rough position can be detected. On the other hand, in the low-speed state immediately before the stop, although it is easy to secure processing time, it is necessary to specify a target position and detect the target position at high accuracy. In the moving apparatus 1, since the reading range can be switched in the high-speed state and in the low-speed state, the position of the moving machine 20 can be read in an appropriate reading range corresponding to moving speed. Therefore, processing efficiency is high.

When all of a large number of IC tags in a wide range are read while a moving machine is moving at high speed, data processing takes time and some IC tags fail to be read because of interference of the IC tags. In the moving apparatus 1, since the high-speed flags are set to limit a processed information, amount in the high-speed state, it is possible to prevent an increase in a processing amount and reduce a processing load. Further, it is possible to prevent the interference of the IC tags. Therefore, it is possible to prevent the failure to read the IC tags and maintain high reading accuracy. The IC tags 34 as reading targets of the plural reading units 41 and 42 are set common to the reading units 41 and 42. A reading range only has to be changed. Therefore, a facility can be simplified.

Since a position of the moving machine 20 is detected from IC data of the plural IC tags 34, even if any one of the IC tags 34 is broken, it is possible to detect the position from the IC data of the IC tags 34 around the broken IC tag 34. For example, when position information of the stop position Pstop is 2000, even, if the IC tag 34 for IC data 2000 is broken, it is possible to determine that the position of the moving machine 20 reaches 2000 by detecting two IC data of 1999 and 2001.

The present invention is not limited to the embodiment per se. At an implementation stage, the components of the embodiment can be modified and embodied without departing from the spirit of the present invention. For example, in the embodiment, the position control is performed by the control unit 22 in the cockpit 21. However, the present invention is not limited to this. For example, it is also possible to carry out, through a wireless LAN, the control from a control and monitoring room separately provided from the moving machine 20. In the embodiment, as an operation pattern of the moving machine, a pattern of speed changing in the order of acceleration, high-speed movement, deceleration, low-speed movement, and stop is illustrated. However, the present invention is not limited to this. Reference values of position information and speed are not limited to those in the embodiment. In the example explained in the embodiment, the two reading units are provided. However, the present invention is not limited to this. The present invention can also be applied when only one reading unit is provided. The position information stored in the IC tags 34 is not limited to the order data illustrated in the embodiment. Other information can be applied. Besides, the present invention is not limited to the embodiment and can be variously modified and carried out without changing the gist thereof.

While certain embodiments have been described, these embodiments have been presented by way of example only, and are not intended to limit the scope of inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A position detecting system comprising:
a moving machine capable of moving along a predetermined path;
plural storage media configured to store position information and arranged in parallel along the path;
and a reading unit provided on the moving machine side and configured to read the position information of the storage media arranged in a reading range corresponding to the reading unit, wherein
array information corresponding to positions of the plural storage media is stored in the storage media as the position information,
the system includes, as the reading unit, a first reading unit and a second reading unit having a reading range wider than that of the first reading unit,
the system changes the reading range according to moving speed of the moving machine to read the position information of the storage media with the first reading unit when the moving speed of the moving machine is in a low-speed state and reads the position information of the storage media with the second reading unit when the moving speed of the moving machine is in a high-speed state, and
the system excludes, in the reading by the second reading unit, a part of the position information obtained from the plural storage media arranged in the reading range based on an order set in advance.

2. The system according to claim 1, further comprising a control unit configured to change the reading range according to moving speed of the moving machine.

3. The system according to claim 1, wherein the system controls the moving speed of the moving machine according to a distance from a stop position of the moving machine.

4. The system according to claim 1, wherein the system excludes, in the reading by the second reading unit, a part of the plural storage media arranged in the reading range from reading targets.

5. The system according to claim 1, wherein high-speed flags are set in a part of the storage media arranged at equal intervals among the plural storage media, and the second reading unit reads, in the reading, only the storage media set with the high-speed flags among the plural storage media arranged in the reading range.

6. The system according to claim 1, further comprising a cable antenna arranged along the path and configured to perform radio communication with the moving machine, wherein the plural storage media are detachably attached to the cable antenna in parallel along the path.

7. The system according to claim 1, further comprising a cable unit including: a leaky coaxial cable arranged along the moving path and configured to function as an information transmission path and an antenna for performing radio communication; and the plural storage media arranged in parallel along a longitudinal direction of the leaky coaxial cable and configured to store position information, wherein the reading unit reads position information of the storage media provided in the cable unit.

8. A cable unit comprising:
a leaky coaxial cable configured to function as an information transmission path and an antenna for performing radio communication; and
plural storage media provided in parallel along a longitudinal direction of the leaky coaxial cable and configured to store position information, wherein
high-speed flags are set in a part of the plural storage media at equal intervals along with the position information.

9. The cable unit according to claim 8, wherein a first outer skin member forming an outer circumferential surface of a fixing wire for fixing the leaky coaxial cable to a supporting line arranged along a predetermined path, a second outer skin member forming an outer circumferential surface of the leaky coaxial cable, and a housing forming a housing section for holding the storage media are integrally formed by resin molding.

* * * * *